US006867569B2

(12) United States Patent
Taniguchi et al.

(10) Patent No.: US 6,867,569 B2
(45) Date of Patent: Mar. 15, 2005

(54) ABNORMALITY DETECTION APPARATUS OF VEHICLE AC GENERATOR

(75) Inventors: Makoto Taniguchi, Kariya (JP); Katsuya Muto, Okazaki (JP)

(73) Assignee: Denso Corporation, Kariya (JP)

( * ) Notice: Subject to any disclaimer, the term of this patent is extended or adjusted under 35 U.S.C. 154(b) by 37 days.

(21) Appl. No.: 10/147,996

(22) Filed: May 20, 2002

(65) Prior Publication Data
US 2002/0193922 A1 Dec. 19, 2002

(30) Foreign Application Priority Data

Jun. 7, 2001 (JP) .................................. 2001-172686
Mar. 14, 2002 (JP) .................................. 2002-069667

(51) Int. Cl.[7] .......................... H02H 7/06; H02P 11/00; H02P 9/00
(52) U.S. Cl. .......................... 322/28; 322/24
(58) Field of Search ............... 322/22, 24, 26, 322/27, 28, 29; 701/34; 340/436, 455

(56) References Cited

U.S. PATENT DOCUMENTS

| 4,096,558 A | * | 6/1978 | Jensen ............................ 363/41 |
| 4,178,546 A | * | 12/1979 | Hulls et al. .................. 324/772 |
| 4,242,674 A | | 12/1980 | Wheeler |
| 4,315,204 A | | 2/1982 | Sievers et al. |
| 4,459,548 A | * | 7/1984 | Lentz et al. .................. 324/772 |
| 5,093,611 A | * | 3/1992 | Nakamura et al. ............ 322/90 |
| 5,221,886 A | * | 6/1993 | Pierret et al. .................. 322/28 |
| 5,416,416 A | | 5/1995 | Bisher ........................... 324/426 |
| 5,537,015 A | * | 7/1996 | Karwath ........................ 318/439 |
| 5,793,167 A | * | 8/1998 | Liang et al. ................... 318/141 |
| 6,163,138 A | * | 12/2000 | Kohl et al. ..................... 322/28 |
| 6,181,583 B1 | * | 1/2001 | Okui et al. ..................... 363/45 |
| 6,204,643 B1 | * | 3/2001 | Kouwa et al. .................. 322/28 |
| 6,215,271 B1 | * | 4/2001 | Lerow et al. ................. 320/104 |
| 6,215,285 B1 | | 4/2001 | Harmon |
| 6,434,025 B2 | * | 8/2002 | Shirai et al. ................ 363/21.1 |
| 6,734,653 B2 | * | 5/2004 | Taniguchi et al. ............. 322/24 |
| 2001/0054890 A1 | * | 12/2001 | Thibedeau et al. ......... 324/76.41 |
| 2002/0043962 A1 | * | 4/2002 | Taniguchi et al. ............. 322/28 |

FOREIGN PATENT DOCUMENTS

JP          A 8-65914         3/1996

OTHER PUBLICATIONS

Taniguchi, "Journal of Denso Technical Disclosure 132–030" Jul. 15, 2001. (w/abstract).

* cited by examiner

Primary Examiner—Joe Waks
Assistant Examiner—Julio Gonzalez Ramirez
(74) Attorney, Agent, or Firm—Oliff & Berridge, PLC

(57) ABSTRACT

An abnormality detection apparatus of a vehicle AC generator that includes a rectifier for providing DC voltage is disclosed. The abnormality detection apparatus includes an abnormality judging unit and an alarm lamp. The abnormality judging unit judges abnormality of the vehicle AC generator if the number of ripples that is included in the output voltage of a rectifier is not equal to or more than a predetermined number for a predetermined period. The alarm lamp lights when the abnormality judging unit judges abnormality.

16 Claims, 15 Drawing Sheets

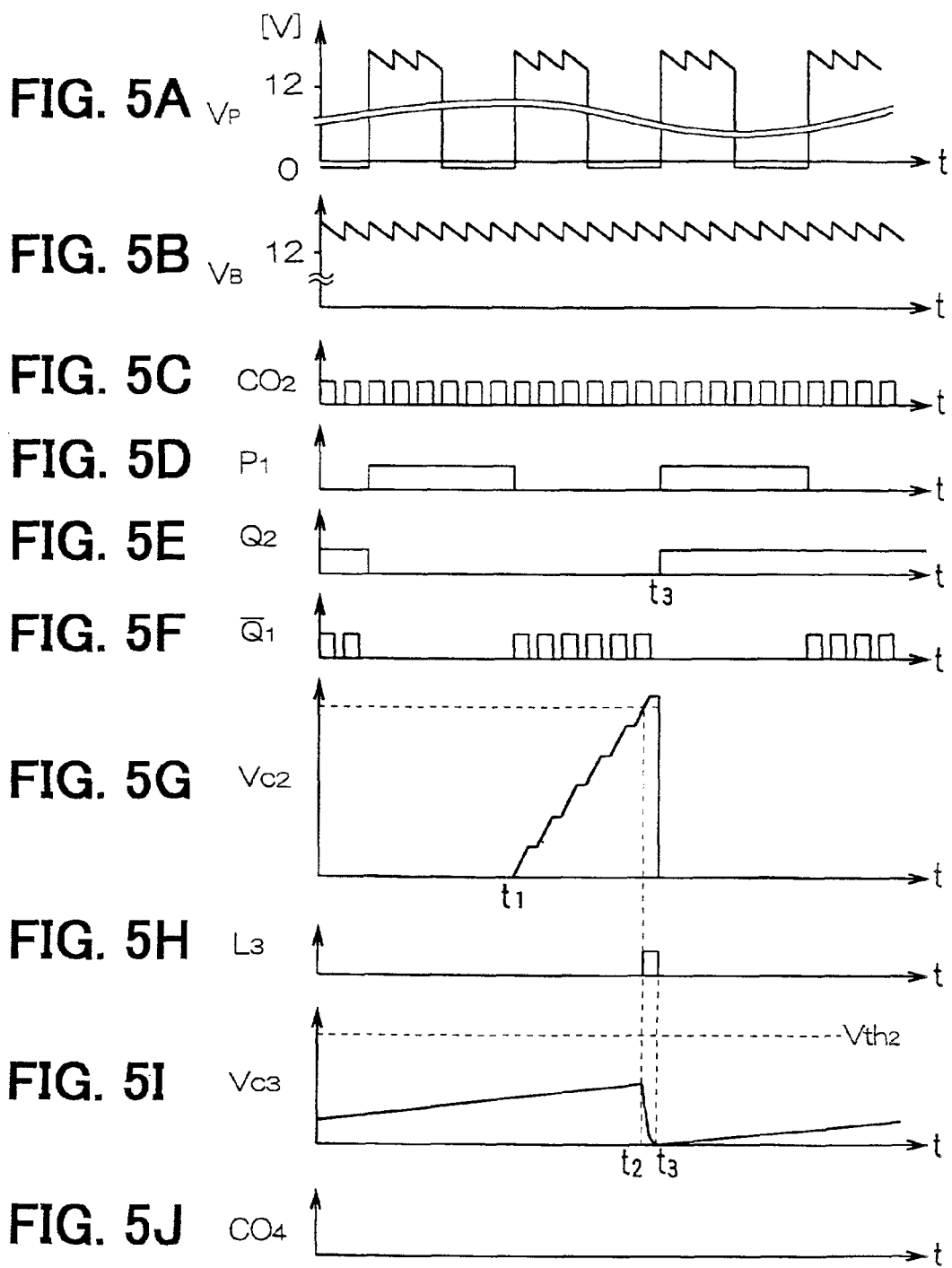

FIG. 6A $V_P$
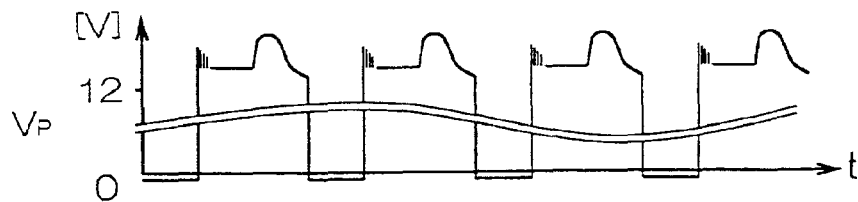
FIG. 6B $V_B$
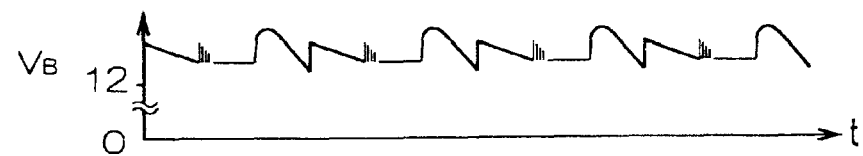
FIG. 6C $CO_2$
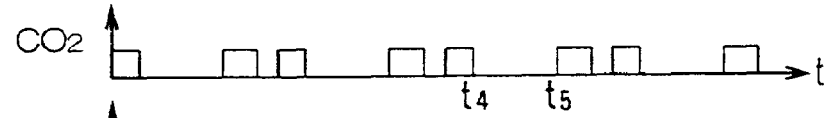
FIG. 6D $P_1$
FIG. 6E $Q_2$
FIG. 6F $\overline{Q}_1$
FIG. 6G $V_{C2}$
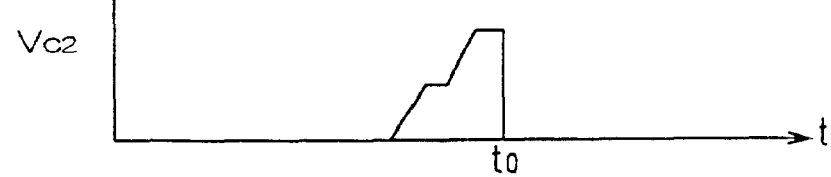
FIG. 6H $L_3$
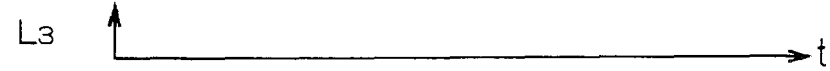
FIG. 6I
FIG. 6J $CO_4$
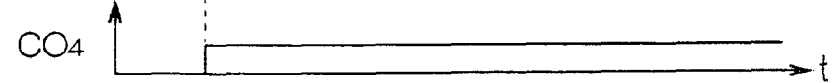

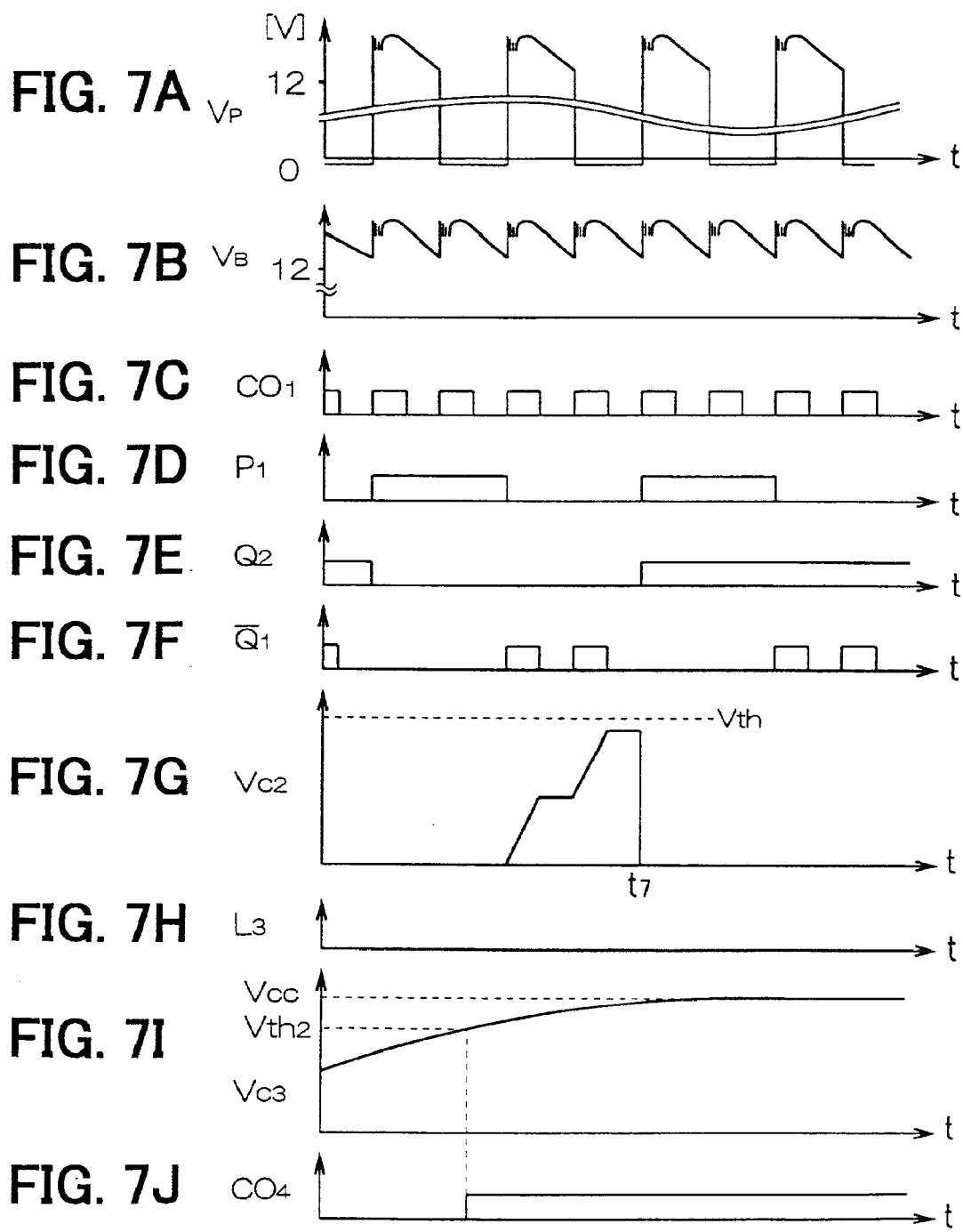

FIG. 13A $V_P$
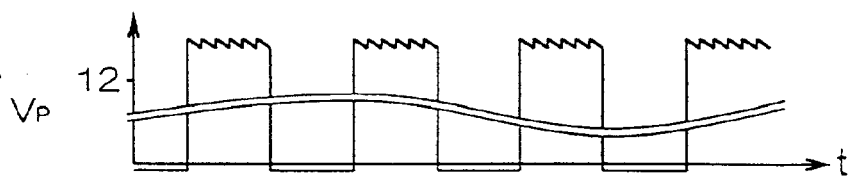
FIG. 13B $V_B$
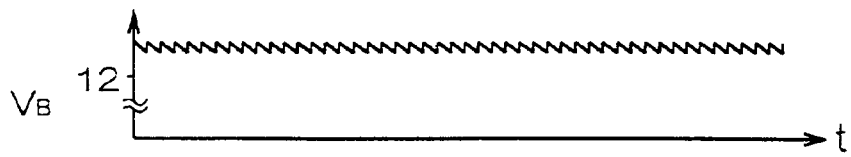
FIG. 13C $CO_2$
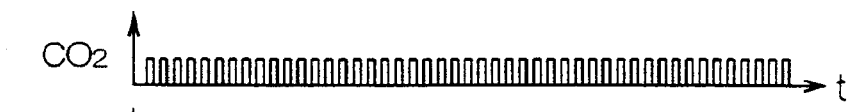
FIG. 13D $P_1$
FIG. 13E $Q_2$
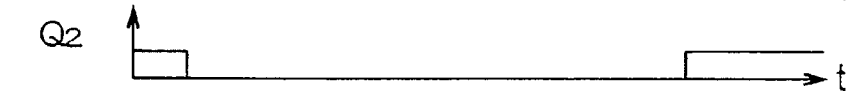
FIG. 13F $\overline{Q}_1$
FIG. 13G $V_{C2}$
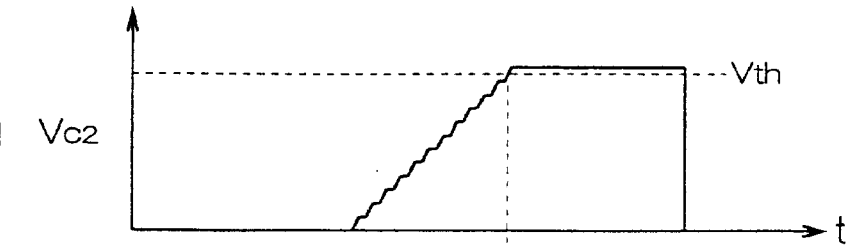
FIG. 13H $L_3$
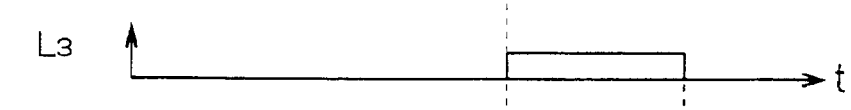
FIG. 13I $V_{C3}$
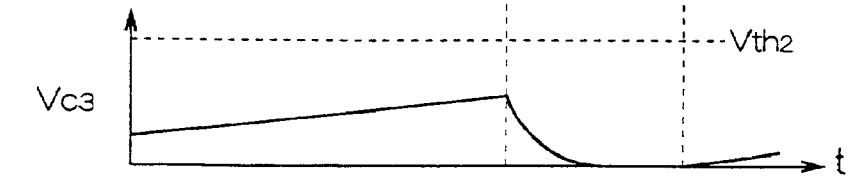
FIG. 13J $CO_4$

ABNORMALITY DETECTION APPARATUS OF VEHICLE AC GENERATOR

CROSS REFERENCE TO RELATED APPLICATION

The present application is based on and claims priority from the following Japanese Patent Applications: 2001-172686, filed Jun. 7, 2001 and 2002-69667, filed Mar. 14, 2002, the contents of which are incorporated herein by reference.

BACKGROUND OF THE INVENTION

1. Field of the Invention

The present invention relates to an abnormality detection apparatus for a vehicle AC generator to be mounted in a passenger car or a truck.

2. Description of the Related Art

Electric power for an automotive vehicle increases year by year because various electric apparatus have been developed and mounted in the automotive vehicle to meet social demand. In order to fulfill the demand for increase in the electric power, the vehicle AC generator is improving while the size thereof is decreasing. In general, the magnitude of damage caused by the abnormal operation thereof increases as the output power of the vehicle AC generator increases. Therefore, it is necessary to alarm a driver of such abnormality of the vehicle AC generator as soon as possible.

A vehicle AC generator includes a field coil for polarizing a pole core that supplies a rotating magnetic field. The output voltage thereof is controlled by controlling conduction rate of a power transistor that supplies field current to the field coil. Such abnormality detection has been known well for a long time. For example, an abnormality is judged if a relationship between the voltage level of a vehicle battery and conduction rate of the field coil is off a predetermined normal value. However, such an abnormality detection apparatus is not only reliable but can not detect abnormality until the vehicle AC generator has completely failed.

JP-A-8-65914, which is entitled "CONTROL APPARATUS OF VEHICLE AC GENERATOR", discloses another abnormality detection apparatus, and U.S. Pat. No. 4,242,674, which is entitled "ALTERNATOR FAILURE WARNING INDICATOR", discloses another abnormality detection apparatus. The control apparatus that is disclosed in JP-A-8-65914 judges abnormality by duty ratio of the output wave induced in an armature winding of a vehicle AC generator. On the other hand, the failure warning indicator that is disclosed in U.S. Pat. No. 4,242,674 detects a peak value of ripples of DC output voltage and judges abnormality if there is a ripple whose peak value is equal to or higher than a predetermined value.

The control apparatus disclosed in JP-A-8-65914 can detect abnormality by the duty ratio of the output voltage of the armature winding which changes if there is abnormality. However, if there is abnormality, such as a short circuit in a phase-winding of the armature winding or between two phase-windings, the control apparatus can not detect abnormality because the duty ratio of the output voltage of the armature winding does not change.

Incidentally, wave shapes of an armature winding of a vehicle AC generator when abnormality occurs at various portions of the vehicle AC generator are shown in FIGS. 8A–8E: FIG. 8A shows a normal wave shape; FIG. 8B shows a wave shape when a positive side diode short-circuits; FIG. 8C shows a wave shape when a negative side diode short-circuits; FIG. 8D shows a wave shape when there is a short circuit between two phase-windings; and FIG. 8E shows a wave shape when there is a breaking of wire in the armature winding.

If any of the diodes fails, the duty ratio of the output voltage of the armature winding changes (for example, the duty ratio of 50% at the normal condition changes to 67% if a positive diode short-circuits and to 33% if a negative diode short-circuits). On the other hand, if the armature winding fails, the duty ratio of the output voltage of the armature winding is still 50%. Therefore, the control apparatus disclosed in JP-A-8-65914 can not detect the abnormality of the armature winding.

Recently, a vehicle AC generator that has a pair of armature windings and a pair of rectifiers, as shown in FIG. 12, has come into wide use in order to reduce noises. If one of the pair of rectifiers of a vehicle AC generator that connects to one of the pair of armature winding fails, the duty ratio of the output voltage of the other armature winding does not change. For example, if any of diodes forming one of a pair of rectifiers for supplying the rectified output voltage of one of a pair of armature windings to a voltage regulator that has abnormality detecting function, it is possible to detect such abnormality by the control apparatus disclosed in JP-A-8-65914. However, the output voltage of the other armature winding does not significantly change even if one of the diodes of the other rectifier fails. Thus, it is not possible to detect abnormality of the other rectifier that is not connected to the voltage regulator.

In order to detect abnormality of both the rectifiers, it is necessary to detect the output voltages of both the armature windings. However, the number of input terminals of the control apparatus increases and the structure becomes complicated, resulting in low reliability of the circuit.

Although the failure warning indicator disclosed in U.S. Pat. No. 4,242,674 has a function of preventing the above problem, it has the following problems.

In a generator that is always driven at a constant rotation speed, such as a generator for an airplane, the failure warning indicator disclosed in U.S. Pat. No. 4,242,674 is very useful. However, the rotation speed of the vehicle AC generator that is driven by a vehicle engine always changes, and the amplitude of the ripple of the output voltage thereof always changes. In addition, the electric load of the AC generator changes frequently because a brake lamp frequently turns on or off when the vehicle decelerates or stops at a traffic signal. The detection accuracy may lowers if maintenance service is provided at comparatively longer intervals relative to the lifetime thereof. Therefore, it is very difficult to detect abnormality of the vehicle AC generator only by the ripple of the output voltage thereof.

In order to prevent the above inconvenience, U.S. Pat. No. 4,315,204 discloses a vehicle AC generator that employs a ripple detection means. However, it is not possible to accurately detect abnormality only by detecting the amplitude of the ripple. Therefore, the disclosed vehicle AC generator includes various other detecting means, which causes the structure complicated, large and impractical.

U.S. Pat. No. 4,178,546 discloses a device that detects frequency of ripples of DC output voltage of a generator and judges abnormality if the frequency is different from a predetermined value. However, it is very difficult to detect the frequency of the ripples that change with the rotation speed of the generator because the generator is driven by an engine whose rotation speed always changes. For example, the device disclosed in U.S. Pat. No. 4,178,546 needs a tracking filter, which is too large to be mounted in a voltage regulator of a generator.

There is an idea that the output current of a generator is directly detected. However, it is necessary to employ an expensive sensor of high response and accuracy.

SUMMARY OF THE INVENTION

The present invention has been made, in view of the above problems, to provide an abnormality detection apparatus that surely detects abnormality of a vehicle AC generator with high accuracy without employing an expensive device or sensor.

In order to solve the above problems an abnormality detection apparatus of a vehicle AC generator according to the invention is comprised of abnormality detecting means and alarming means. The abnormality detecting means judges abnormality of the vehicle AC generator if the number of ripples is included in the output voltage of a rectifier for a predetermined period is not equal to or more than a predetermined number. The alarming means displays an alarm when the abnormality detecting means judges abnormality. Therefore, it is not necessary to employ a special sensor or device to detect abnormality of the vehicle AC generator. It is only necessary to wave-shape the signal that is detected by a voltage regulator of the vehicle AC generator. Therefore, the abnormality can be surely and accurately detected, so that an alarm can be given without delay. Since abnormality alarm can be given to a driver without delay, it is possible to take possible steps to prevent various accessories from being damaged.

It is preferable that the abnormality detecting means judges abnormality at every period of a half cycle or a multiple of cycles of output voltage of at least one phase-winding of the multiple phase armature winding as a predetermined period. Accordingly, it is possible to set the period for detecting the ripples without employing a special timer circuit or the like. It is also possible to follow voltage change of the vehicle AC generator, whose rotation speed changes frequently.

It is preferable that the abnormality detecting means judges abnormality if the number of the ripples is equal to or more than a number defined by an expression km−j for the predetermined period, where the number of phases of the multiple phase armature winding is m, the number of the rectifiers is j and k is an integer that is 1 or larger than 1. Accordingly, it is possible to make a abnormality judgement rule clear, so that abnormality can be detected with higher accuracy.

It is also preferable that the alarming means stops displaying an alarm if the conduction rate is smaller than a value expressed by (2 km−j)/2 km. If abnormality occurs while the output power of the vehicle AC generator is comparatively smaller, the vehicle AC generator and other vehicle accessories are not severely damaged. Accordingly, it is possible to stop displaying an alarm to prevent frequent alarming. This prevents the lifetime of the alarming means.

Further, it is possible to detect the ripple components by a simple filter because the ripple components are not severely affected by fluctuation of the output voltage due to frequent operation of the switching means during the period of the abnormality detection.

For example, FIGS. 11A and 11B show wave-shapes of the output voltage of a rectifier with the conduction rate being respectively about 50% and about 83%, where m=3, j=1, and k=1. As shown in FIG. 11A, if the conduction rate is small, the voltage fluctuation caused by the switching operation is larger than that of the rectifying operation shown in a dotted line. The amplitude of the voltage fluctuation caused by the switching operation is related to a time constant of the vehicle AC generator and, particularly, a time constant of a field coil. The amplitude of the voltage fluctuation is the largest when the conduction rate is about 50%. On the other hand, if the conduction rate is comparatively larger, as shown in FIG. 1B, the voltage fluctuation caused by the switching operation, which is shown by a dotted line, is small.

If the ripple components are to be accurately detected by an AC coupling filter, the ripple components may not be buried under the voltage fluctuation caused by the switching operation. If the conduction rate is smaller or larger than 50%, the voltage fluctuation caused by the switching operation becomes smaller so that the ripples can be easily detected by such an AC coupling filter.

If the vehicle AC generator fails when the conduction rate is small, the output power thereof decreases instantly. As a result, the voltage of a battery lowers. Consequently, the voltage regulator of the vehicle AC generator immediately operates to increase the conduction rate of the switching means to maintain the output power. Therefore, the conduction rate is maintained at a high level. Thus, the inventors found the following fact after a research: if the abnormality detection is carried out only when the conduction rate of the switching means is comparatively high, the ripples can be detected by a simple filter. It has bee found that such a conduction rate is larger than a value that is expressed by (2 km−j)/2 km.

FIG. 11C shows a wave-shape of the voltage wave when the rotation speed of the vehicle AC generator is twice as many as the rotation speed shown in FIG. 11B or the same as the rotation speed shown in FIG. 11B, where m=6, j=2, and k=1. The frequency of the ripple components increases in proportion to the rotation speed of the vehicle AC generator. It also increases in proportion to the number of the rectifiers j. The cycle of the conduction rate change of the switching means is constant and does not depend on the rotation speed or the number of the rectifiers. Therefore, if the minimum value of the conduction rate for the abnormality detection is set at (2 km−j)/2 km, it is possible to detect abnormality even the engine runs at its idling speed, where the ripple frequency is the lowest.

It is preferable that at least one of the elements of the rectifier is a Zener diode having a backward breakdown characteristic. In the vehicle AC generator as constructed above, a Zener diode most likely to be damaged. If the Zener diode is damaged, a large number of parts of the vehicle AC generator may suffer damage. If the abnormality detection apparatus according to the invention is applied to a vehicle AC generator, it is possible to detect abnormality of the vehicle AC generator and to prevent such damage from increasing.

It is also preferable that the vehicle AC generator comprises a plurality of multiple-phase windings insulated from each other and a plurality of the rectifiers for respectively rectifying output voltages of the plurality of multiple phase windings. Therefore, it is easy to make the apparatus compact and to easily mount the same into the vehicle AC generator.

It is preferable that the abnormality detecting means judges abnormality by comparing a mean value of output voltage of the rectifiers after high harmonic frequency waves are removed therefrom with the output voltage. Accordingly, even if a roller component is included in the output voltage, the ripple components can be detected with high accuracy.

It is preferable that the abnormality detection apparatus further includes an amplitude detecting means for detecting the amplitude of the output voltage of the rectifiers and that the alarming means stops displaying an alarm if the amplitude of the output voltage detected by the amplitude detecting means is equal to or lower than a predetermined value. Accordingly, if the amplitude of the output voltage of the rectifier is equal to or smaller than a predetermined value, abnormality detection is not carried out. Therefore, it is possible to prevent erroneous alarming that may be caused by noises coming from an outside electric device while the vehicle AC generator operates normally.

In the recently available vehicle AC generator whose noises have been drastically reduced, the ripple of the output voltage after rectified is very small. Therefore, it is very difficult to detect the ripple when the electric load is small at a low rotation speed because other noises caused by other devices such as an ignition system are more significant. In addition, if an electrical distance between the vehicle AC generator and a battery or the inductance of a power line is small, the amplitude of the ripple is small. This tendency is stronger among recent small-sized cars. The abnormality detection apparatus according to the present invention can prevent erroneous alarming even if the amplitude of the ripple is smaller than noises caused by other electric devices.

It is also preferable that the abnormality detection apparatus includes voltage mean value detecting means, so that the alarming means stops displaying an alarm if the voltage mean value detected by the voltage mean value detecting means is equal to or larger than a predetermined value. When abnormality takes place, the battery can not be charged sufficiently, and the battery voltage lowers gradually. On the other hand, alarming is stopped if the battery voltage does not lowers because the vehicle AC generator still generates power to charge the battery. In that case, the degree of the abnormality is low and may not cause damage.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIGS. 5A–5J are timing charts illustrating operations of various portions of a voltage regulator when the vehicle AC generator operates at a normal condition;

FIGS. 6A–6J are timing charts illustrating operations of various portions of the voltage regulator when a positive diode short-circuits;

FIGS. 7A–7J are timing charts illustrating operations of various portions of the voltage regulator when a layer-short takes place in the armature winding;

FIGS. 13A–13J are timing charts of operations of various portions of the voltage regulator when the vehicle AC generator shown in FIG. 12 operates in a normal condition;

DETAILED DESCRIPTION OF THE PREFERRED EMBODIMENTS

A vehicle AC generator according to preferred embodiments of the invention are described with reference to the appended drawings.

Figure 1:
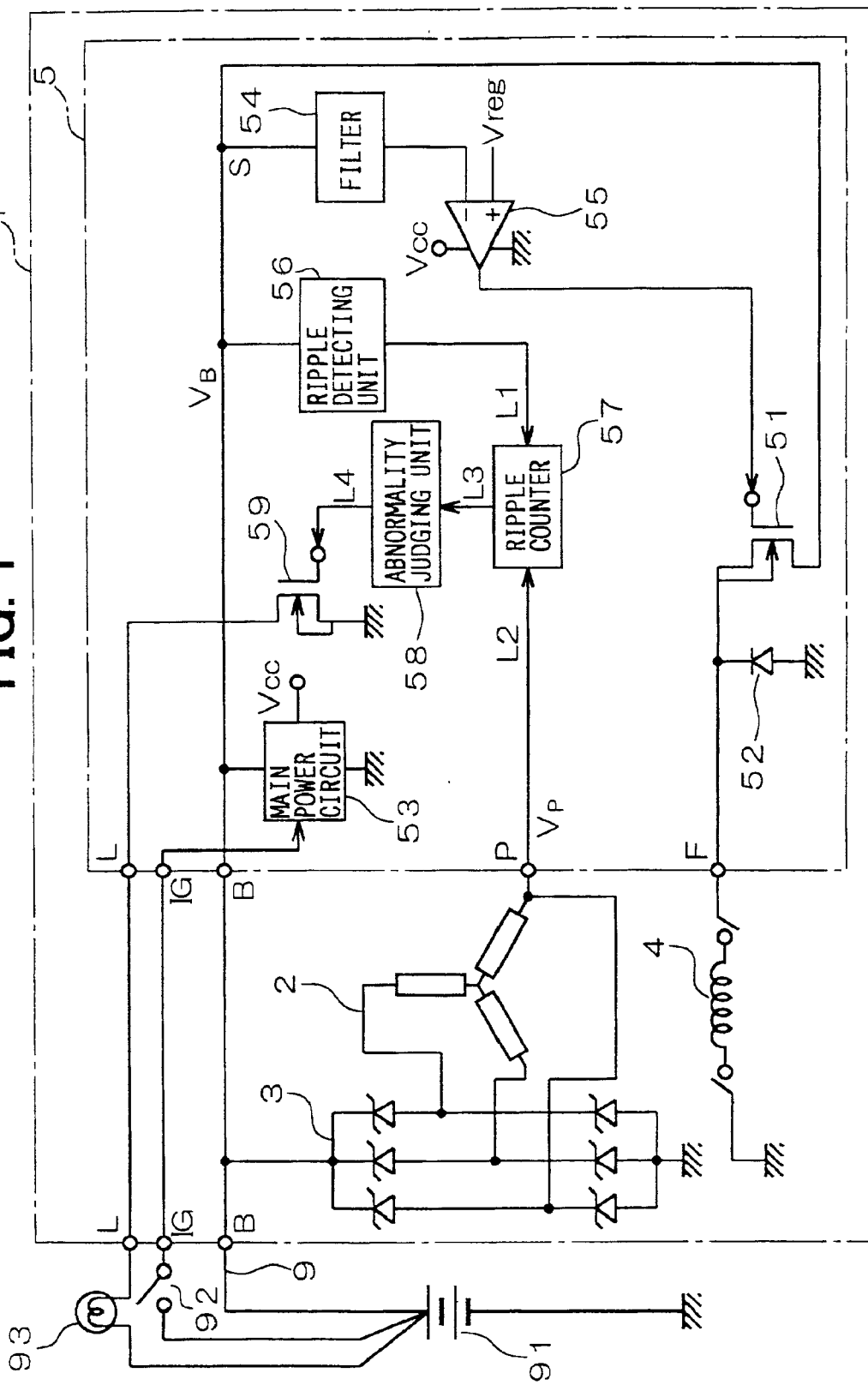
FIG. 1 is a view showing a vehicle AC generator according to the first embodiment.

FIG. 1 shows a structure of a vehicle AC generator according to a first embodiment of the invention, in which connection of the vehicle AC generator, a battery and an alarm lamp is illustrated.

As shown in FIG. 1, the vehicle AC generator 1 according to the first embodiment of the invention is comprised of an armature winding 2, a rectifier 3, a field coil 4 and a voltage regulator 5. The armature winding 2 is comprised of a plurality of phase-windings (e.g. three phase-windings), whose induced AC voltage is supplied to the rectifier 3. The rectifier 3 is a full-wave rectifying circuit that rectifies AC power of the armature winding to DC power. The rectifier 3 is comprised of Zener diodes that have a backward breakdown characteristic. The field coil 4 is supplied with field current to generate magnetic flux that makes the armature winding 2 induce AC voltage. The voltage regulator 5 controls the output voltage of the vehicle AC generator 1 at a regulated voltage Vreg. The voltage regulator 5 turns on an alarm lamp 93 to warn a driver of an abnormality if the vehicle AC generator 1 fails.

The vehicle AC generator 1 is connected to a vehicle battery 91 via a B-terminal thereof and a power supply line 9, to a key switch 92 via IG terminal thereof and to the alarm lamp via a L terminal thereof.

The voltage regulator 5 is comprised of a power transistor 51, a flywheel diode 52, a main power circuit 53, a filter unit 54, a voltage comparator 55, a ripple detecting unit 56, a ripple counter 57, an abnormality judging unit 58 and an alarm lamp driving transistor 59. The ripple detecting unit 56, the ripple counter 57 and the abnormality judging unit 58 form an abnormality detecting means.

The power transistor 51 is connected in series to the field coil 4 and forms a switching means for switching the field current supplied to the field coil. The flywheel diode 52 is connected in parallel to the field coil 4 to circulate the field current when the power transistor 51 is opened. When the key switch 92 is turned on, the main power circuit 53 forms driving voltage Vcc from the voltage of the battery 91. The driving voltage Vcc is necessary to drive the voltage regulator 5. The filter unit 54 absorbs higher harmonics included in the output voltage of the rectifier 3.

The voltage comparator 55 compares the output voltage of the filter unit 54 and the regulated voltage Vreg. If the output voltage of the filter unit 54 is lower than the regulated voltage Vreg, the voltage comparator 55 provides a high level output signal. The output terminal of the voltage comparator 55 is connected to a gate of the power transistor

51. If the output voltage of the filter unit 54 is lower than the regulated voltage Vreg, the voltage comparator 55 provides a high level output signal to turn on the power transistor 51.

The ripple detecting unit 56 detects the ripple components included in the output voltage of the rectifier 3. Each time one of the ripple components is detected, the ripple detecting unit 56 provides a detection signal. This detection signal is sent to the ripple counter 57 via a signal line L1. The ripple counter 57 counts the number of the detection signals sent from the ripple counter 57 via the signal line L1 in a period that is determined based on the voltage of one of the phase windings of the armature winding 2. The counted number is sent to the abnormality judging unit 58 via a signal line L3.

The abnormality judging unit 58 judges whether the vehicle AC generator fails or not according to the counted number sent from the ripple counter 57. If it is judged that the vehicle AC generator fails, the abnormality judging unit 58 turns on the alarm lamp driving transistor 59 to operate the alarm lamp 93.

Figure 2:
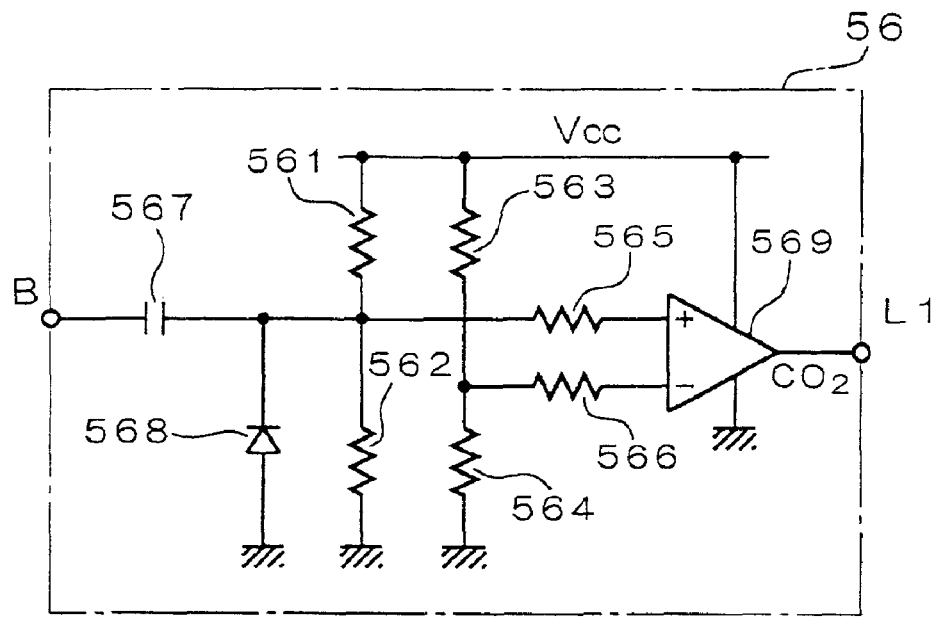
FIG. 2 is a view showing a ripple detecting unit.

FIG. 2 shows a circuit diagram of the ripple detecting unit 56. The ripple detecting unit 56 shown in FIG. 2 is comprised of six resistors 561–566, a capacitor 567, a diode 568 and a voltage comparator 569. In the ripple detecting unit 56, the ripple components included in the output voltage of the vehicle AC generator 1 are taken out through an AC coupling and formed into a pulse signal. The capacitor 567, resistor 562, diode 568 form a high-pass filter, from which the ripple components without DC component are inputted to the positive terminal of the voltage comparator 569. The resistors 561, 562 provide a suitable bias voltage, which is added to the ripple components and inputted to the positive terminal of the voltage comparator 569 via the resistor 565. A predetermined reference voltage that is provided by dividing the electric source voltage Vcc by resistors 563, 564 is inputted to the negative terminal of the voltage comparator 569 via the resistor 566. The reference voltage is slightly higher than the bias voltage that is added to the ripple components. Thus, the voltage comparator 569 outputs a pulse signal that corresponds to the ripple components.

Figure 3:
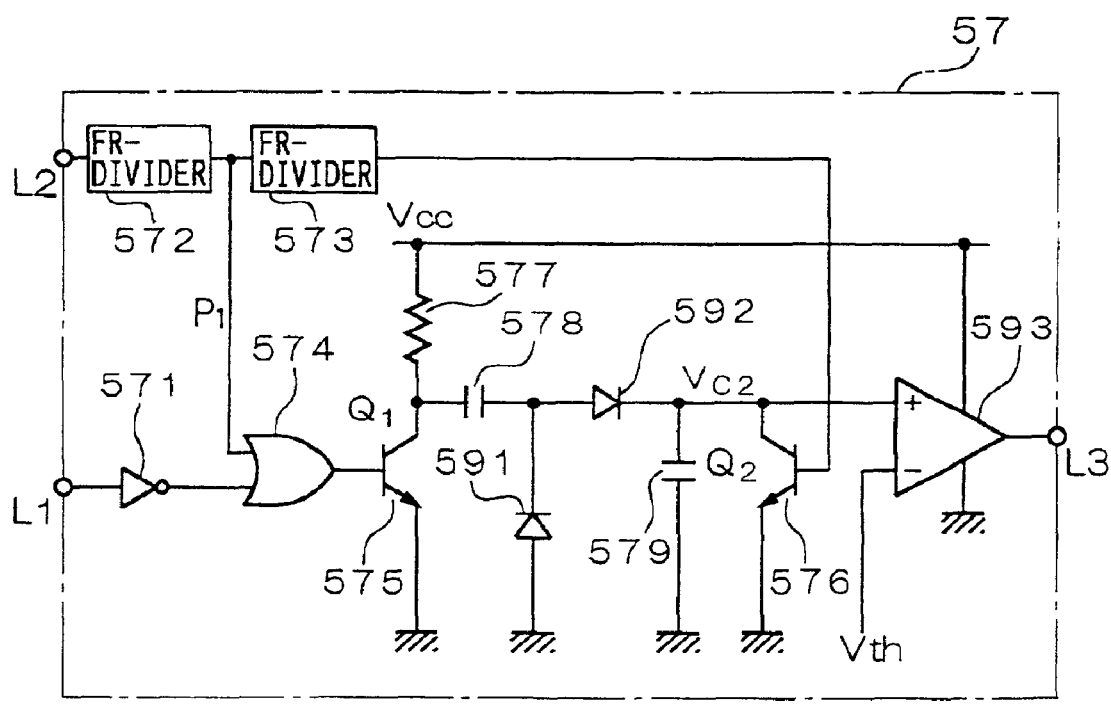
FIG. 3 is a view showing a ripple counter.

FIG. 3 shows a circuit diagram of the ripple counter 57. The ripple counter 57 shown in FIG. 3 is comprised of an inverter 571, a pair of frequency dividers 572, 573, an OR-circuit 574, a pair of transistors 575, 576, a resistor 577, a capacitor 578, a pair of diodes 591, 592 and a voltage comparator 593. The pair of frequency divider is connected in cascade and divides the frequency of a voltage signal Vp of one of the phase-windings of the armature winding 2, whereby a duration signal for counting the number of ripple pulses is provided. The OR-circuit 574 is inputted an output signal of the front frequency divider 572 and a signal that is formed by inverting the ripple pulses outputted from the ripple detecting unit 56 by the inverter 571. The transistor 575 is opened if both the signals are low in voltage level. The pair of transistors 575, 576 is connected to each other by a charge carrying circuit that is comprised of a capacitor 578 and diodes 591, 592. If the transistor 575 at the front stage is opened while the transistor 576 at the rear stage is opened, electric charges flowing from the main power source 53 via the charge carrying circuit are accumulated by the capacitor 579. Therefore, the terminal voltage of the capacitor 579 increases. On the other hand, if the front transistor 575 is closed, the electric charges flowing from the main power source 53 go to a ground via the transistor 575. Therefore, the capacitor 579 is not charged. If the rear transistor 576 is closed, the capacitor 579 discharges the accumulated electric charges. The voltage comparator 593 has a positive terminal to which the terminal voltage of the capacitor 579 is applied and a negative terminal to which a predetermined threshold voltage Vth is applied. If the terminal voltage of the capacitor 579 becomes higher than the threshold voltage Vth, the voltage comparator 593 outputs a high level signal.

Figure 4:
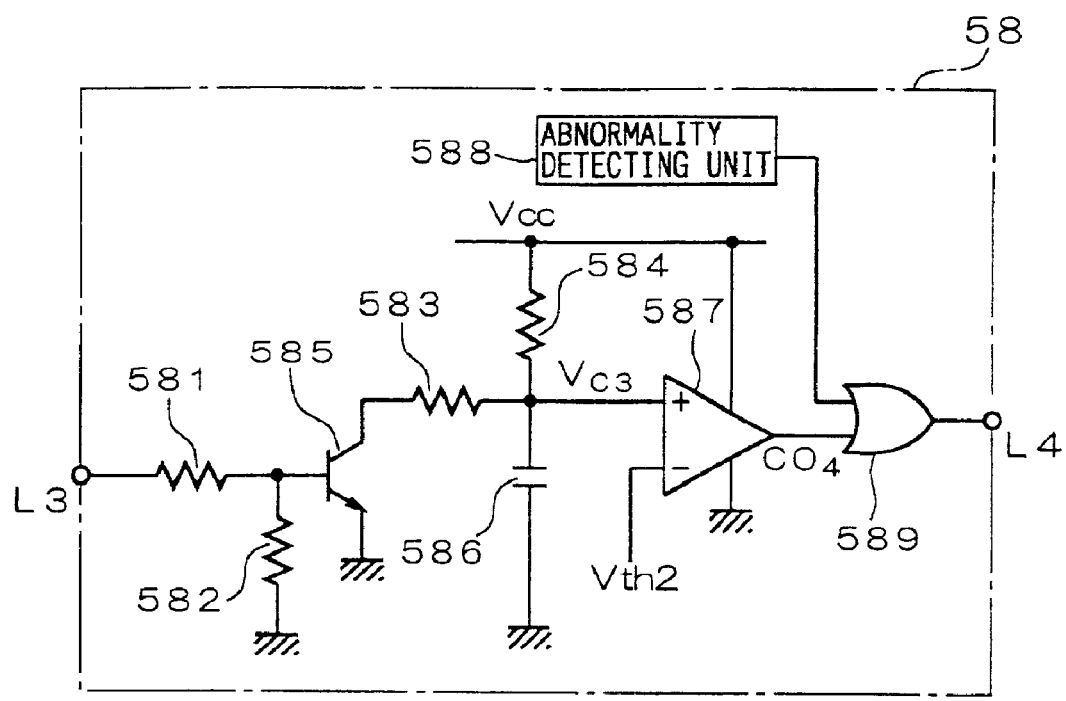
FIG. 4 is a view showing an abnormality detecting unit.

FIG. 4 shows a circuit diagram of the abnormality detecting unit 58. The abnormality judging unit 58 shown in FIG. 4 is comprised of four resistors 581–584, a transistor 585, a capacitor 586, a voltage comparator 587, an abnormality detecting circuit 588 and an OR-circuit 589. The output signal of the ripple counter 57 is inputted to the base of the transistor 585 via the resistor 581. The capacitor 586 has an end connected to the ground and the other end connected to the main power circuit 53 via the resistor 584 and to the collector of the transistor 585 via the resistor 583.

If the output signal of the ripple counter 57 is low, the transistor 585 is opened, and the capacitor 586 is charged with electric charges flowing from the main power circuit 53, so that the terminal voltage of the capacitor 586 increases. If, on the other hand, the output signal of the ripple counter 57 is high, the transistor 585 is closed, and the electric charges accumulated in the capacitor 586 are discharged via the transistor 585. The voltage comparator 587 has a positive terminal to which the terminal voltage of the capacitor 586 is applied and a negative terminal to which a predetermined threshold voltage Vth2 is applied. If the terminal voltage of the capacitor 586 becomes higher than the threshold voltage Vth2, the output signal of the voltage comparator 587 becomes high. The output signal of the voltage comparator 587 is sent to the alarm lamp driving transistor 59 via the OR-circuit 589. The abnormality detecting circuit 588 is a circuit for detecting abnormality of the vehicle AC generator 1 in a way different from the invention in which the ripple signal is detected. The abnormality detecting unit 588 provides a high level signal if a magnetic field circuit or any of power supply lines fails.

Operation of the above-described voltage regulator 5 that is included in the vehicle AC generator is described hereafter.

(1) During Normal Operation

FIGS. 5A–5J are timing charts showing operation of various portions of the voltage regulator 5 when the vehicle AC generator 1 operates without abnormality. Incidentally, the reference characters in FIGS. 5A–8 respectively correspond to the reference characters presented in FIG. 2 and others.

Output voltage Vp of one of the phase-windings of the armature winding 2 in normal operation has a wave-shape that includes ripple components, and the duty ratio of the output voltage Vp is about 50%, as shown in FIG. 5A. DC output voltage $V_B$ of the rectifier 3 includes saw-tooth-like ripple components, as shown in FIG. 5B. The DC output voltage in the normal operation includes 2 m ripple components each electric cycle that corresponds to a unit cycle of the output voltage of the vehicle AC generator if the armature winding 2 generates m-phase output voltages to be fully rectified. The ripple detecting unit 56 forms a train of ripple pulses, the number of which is equal to the number of the ripple components, from the DC output voltage that includes the ripple components, as shown in FIG. 5C.

In the ripple counter 57, the frequency of the output voltage Vp of a phase-winding of the armature winding 2 is divided into halves to form a signal P1, which is outputted from the front frequency divider 572, as shown in FIG. 5D, as a signal P1. The signal P1 and the ripple pulses, which are sent via the signal line L1, are inputted to the OR-circuit 574, so that the logical sum of the two signals is inputted to the base of the transistor 575. If the output signal of the frequency divider 572 is high, or if the inverted signal of the ripple pulses that is inputted from the ripple detecting unit 56 is high, the output signal of the OR-circuit 574 becomes high, so that the transistor 575 closes. On the other hand, if the output signal of the frequency divider 572 is low and, also, the ripple pulses is high, the transistor 575 opens, as shown in FIG. 5F. When the transistor 575 closes, all the electric charges supplied from the main power circuit 53 go to the ground via the emitter-collector passage of the transistor 575. On the other hand, the electric charges are accumulated in the capacitor 579 via the charge carrying circuit that is comprised of the capacitor 578, and the diodes 591, 592 when the transistor 575 opens. An amount Q2 of the accumulated electric charges increases each time the ripple pulse is generated as long as the transistor 576 opens, as shown in FIG. 5E, so that the terminal voltage of the capacitor 579 gradually increases, as shown in FIG. 5G. If the number of ripple pulses inputted (or detected) becomes equal to or larger than a predetermined number, the terminal voltage of the capacitor 579 becomes larger than the threshold voltage Vth to cause the output signal of the voltage comparator 593 to be high, as shown in FIG. 5H. The output signal of the voltage comparator 593 is inputted to the abnormality judging unit 58.

In the abnormality judging unit 58, when the output signal of the ripple counter 57 is high, the transistor 585 closes to discharge the electric charges accumulated in the capacitor 585 via the resistor 583. When the transistor 585 opens, the driving voltage Vcc is applied to the capacitor 586 via the resistor 584 to charge the capacitor 586. The resistors 584, 583 determines the time constant of the charging/discharging of the capacitor 586. The time constant for the capacitor discharging has to be sufficiently smaller than the time constant for the capacitor charging. For example, the following ratio, (resistance of the resistor 584)/(resistance of the resistor 583), should be between 100–1000.

As a result, the transistor 585 closes to discharge the capacitor 586 before the terminal voltage Vc3 thereof becomes as high as the threshold voltage Vth (time t2), as sown in FIG. 5I. Therefore, output signal CO4 of voltage comparator 587 maintains low level, as shown in FIG. 5I. After all, the alarm lamp driving transistor 59 is not closed to turn on the alarm lamp 93.

When the output signal of the rear frequency divider 573 changes from a low level signal to a high level signal at time t3, the transistor 576 of the ripple counter 57 closes, as shown in FIG. 5E to discharge the capacitor 579, so that the output signal of the ripple counter 57 is maintained at the low level until the output signal of the rear frequency divider 573 becomes low again.

(2) Operation When Positive Diode of Rectifier Short-circuits

If a positive diode of the rectifier 3 short-circuits, operations of various portions of the voltage regulator 5 are shown in timing charts FIGS. 6A–6J.

When one of the positive diodes short-circuits, the output voltage Vp of one of the phase windings of the armature winding 2 has a rectangular wave shape whose duty ratio is about 67%. That is, the positive duration is longer than the negative duration, as shown in FIG. 6A. The DC output $V_B$ of the rectifier 3 includes ripple components and becomes clearly different from the same at the normal operation, as shown in FIG. 6B. The wave shape of the ripples that can be detected in an electric cycle of the output signal of the rectifier appears only twice. There is a period in which the ripple components can not be detected, as in a period t4–t5 shown in FIG. 6C. Thus, the number of pulses outputted from the ripple detecting unit 56 is so small that the capacitor 579 of the ripple counter 57 can not be sufficiently charged. Therefore, the output signal of the frequency divider 573 becomes high before the terminal voltage of the capacitor 579 becomes higher than the threshold voltage Vth to thereby discharge the capacitor 579, as shown in FIG. 6G. Accordingly, the capacitor 586 of the abnormality judging unit 58 does not discharge and the terminal voltage of the capacitor 586 does not become lower than the threshold voltage Vth2 as shown in FIG. 6I. That is, if one of the positive diode of the rectifier 3 short-circuits, the output signal of the voltage comparator 587 of the abnormality judging unit 58 maintains the high level, as shown in FIG. 6J, and the alarm lamp driving transistor 59 closes to light the alarm lamp 93.

(3) Operation When Layer Short Of the Armature Winding Takes Place

If layer short takes place in the armature winding 2, operations of various portions of the voltage regulator 5 are shown in FIGS. 7A–7J.

If layer short takes place in the armature winding 2, the voltage Vp of one of the phase windings of the armature winding 2 has the same rectangular wave having duty ratio of 50% as the wave at the normal operation thereof, as shown in FIG. 7A. The DC output voltage $V_B$ of the rectifier 3 includes the ripple components and is clearly different in shape from the output voltage $V_B$ at the normal operation, as shown in FIG. 7B. In this case, the ripple wave can be detected only twice in an electric cycle of the output signal of the rectifier 3. Namely, as the ripple components appear cyclically, the ripple detecting unit 56 outputs the ripple pulses at equal intervals, as shown in FIG. 7C. If one of the diodes fails, the number of the ripple pulses is so small that the capacitor 579 of the ripple counter 57 cannot be charged sufficiently. As a result, the output signal of the frequency divider 573 becomes high before the terminal voltage of the capacitor 579 becomes higher than the threshold voltage Vth. Consequently, the transistor 576 closes to discharge the capacitor 579, as shown in FIG. 7G. As a result, the capacitor 586 of the abnormality judging circuit 58 does not discharge, so that the terminal voltage of the capacitor 586 does not become lower than the threshold voltage Vth2, as shown in FIG. 7I. If a layer short takes place in the armature winding 2, the output signal of the voltage comparator 587 of the abnormality judging unit 58 maintains the high level, as shown in FIG. 7J. Therefore, the alarm lamp driving transistor 59 closes to keep the alarm lamp 93 lighting.

Thus, the voltage regulator 5 according to the present embodiment of the invention, no special sensor for detecting abnormality is necessary. It is only necessary to wave-shape a signal. Therefore, the abnormality can be accurately detected in a short time and quick alarming can be given. In addition, it is possible to let a driver to know abnormality of the vehicle AC generator 1 immediately, so that some suitable measure can be taken before vehicle accessories are damaged.

Therefore, the ripples can be detected under ever-changing rotation speed of the vehicle AC generator without delay.

In the description of the first embodiment, the operation when the positive diode of the rectifier 3 fails and the operation when layer short takes place in the armature winding are described. However the operation at other abnormality is the same as above.

Figure 8A:
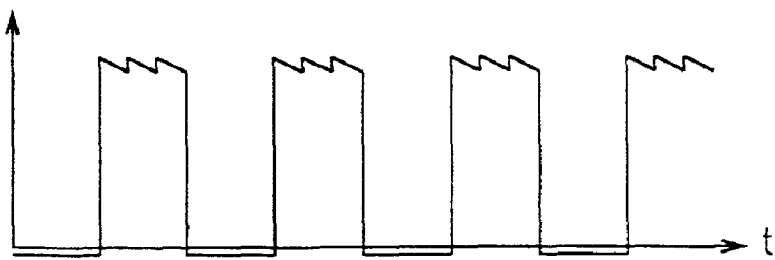
FIGS. 8A–8E are graphs showing output signal wave of one of phase-windings of the armature winding when abnormality takes place at different portions of the armature winding.
Figure 8B:
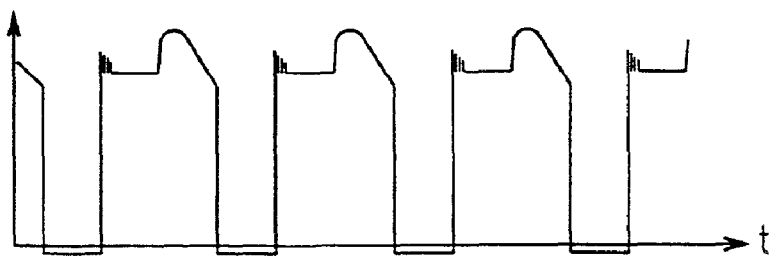
Figure 8C:
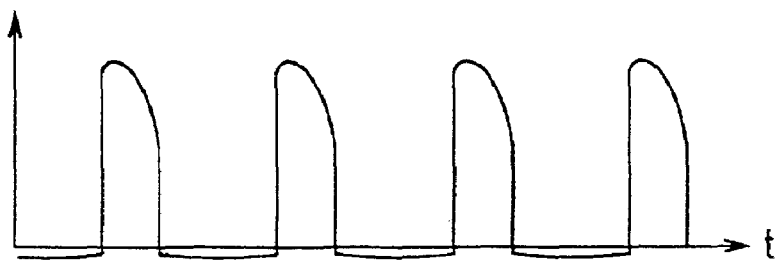
Figure 8D:
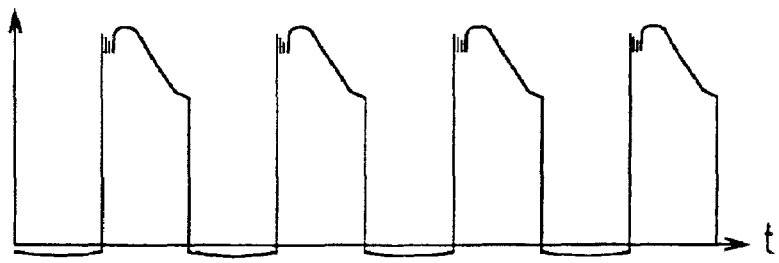
Figure 8E:

FIGS. 8A–8E show signal waves of one of the phase-windings of the armature winding 2 when various kinds of abnormality occur. FIG. 8A shows the wave shape at the normal operation, FIG. 8B shows a wave shape when the positive diode of the rectifier 3 short-circuits, FIG. 8C shows a wave-shape when the negative diode of the rectifier 3 short-circuits, FIG. 8D shows a wave-shape when layer short takes place in the armature winding 2, and FIG. 8E shows a wave-shape when the armature winding 2 breaks down.

When abnormality takes place at any portion, the ripple components included in the output signal of one of the phase windings of the armature winding 2 reduce. Therefore, the capacitor 579 of the ripple counter 57 discharges before the terminal voltage of the capacitor 579 becomes higher than the threshold voltage. As a result, the capacitor 586 of the abnormality judging unit 58 is kept to be charged, and the output signal of the abnormality judging unit 58 is maintained to be high so as to keep the alarm lamp 93 lighting.

The ripple components are generated irregularly when the diode of the rectifier 3 fails and opens, and the alarm lamp 93 can be lit. According to a test result of a full-wave rectifier that is comprised of Zener diodes, if a diode fails and opens, another diode that has opposite polarity to the former diode and is connected to the same arm likely to short-circuit within several minutes. Therefore, although the initial fail of the diode is the open mode, the alarm lamp 93 will turn on within several minutes, so that it can inform the driver of the abnormality.

It is possible that the alarm lamp is not turned on if the conduction rate is small.

Figure 9:
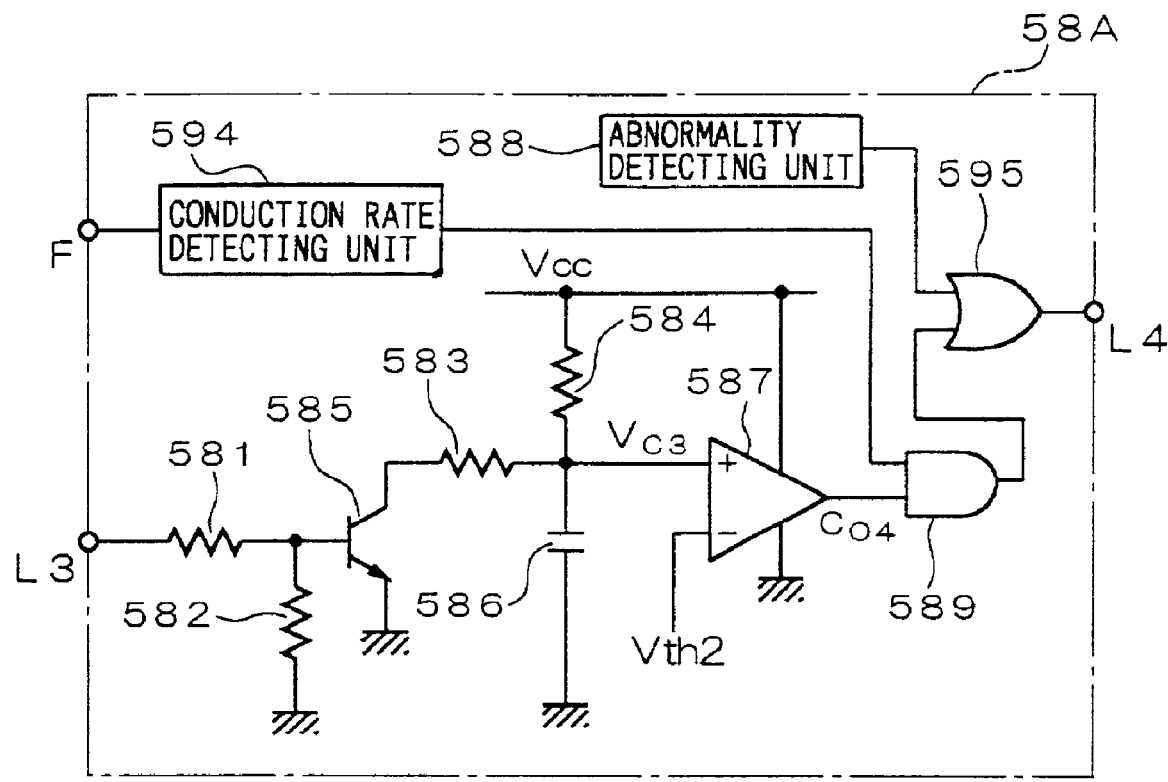
FIG. 9 is a view showing a variation of the abnormality judging unit.

FIG. 9 shows a variation of the abnormality judging unit. The abnormality judging unit 58A shown in FIG. 9 is different from the abnormality judging unit 58 in that a conduction rate detecting unit 594 and an AND circuit 589 are added. The conduction rate detecting unit 594 detects the conduction rate of the transistor 51 based on the wave shape of the signal of the F-terminal to which an end of the field coil 4 and the power transistor 51 are connected. If the conduction rate becomes larger than a predetermined value, the conduction detecting unit 594 provides a high level signal. The conduction rate detecting unit 59 and the AND circuit 589, together, correspond to the conduction rate detecting means.

The AND circuit 589 is inserted between the voltage comparator 587 and a OR circuit 595 to pass or block the output signal of the voltage comparator 587 according to the output signal of the conduction rate detecting unit 594. In other words, only when the conduction rate of the power transistor 51 becomes larger than a predetermined value to make the output signal of the conduction rate detecting unit 594 high, the output signal of the voltage comparator 587 is transmitted to the alarm lamp driving transistor 59 via the OR circuit 595.

Because the alarm is stopped under such low power generation as abnormality may not cause extensive damage, the lifetime of the alarm lamp driving transistor or the alarm lamp 93 can be well maintained.

In the ripple detecting unit 56 of the above first embodiment, the ripples are detected if the ripple components are higher than the reference value that is provided by dividing the operation voltage Vcc by the resistors 563, 564. However, the reference value can be provided in a different way.

Figure 10:
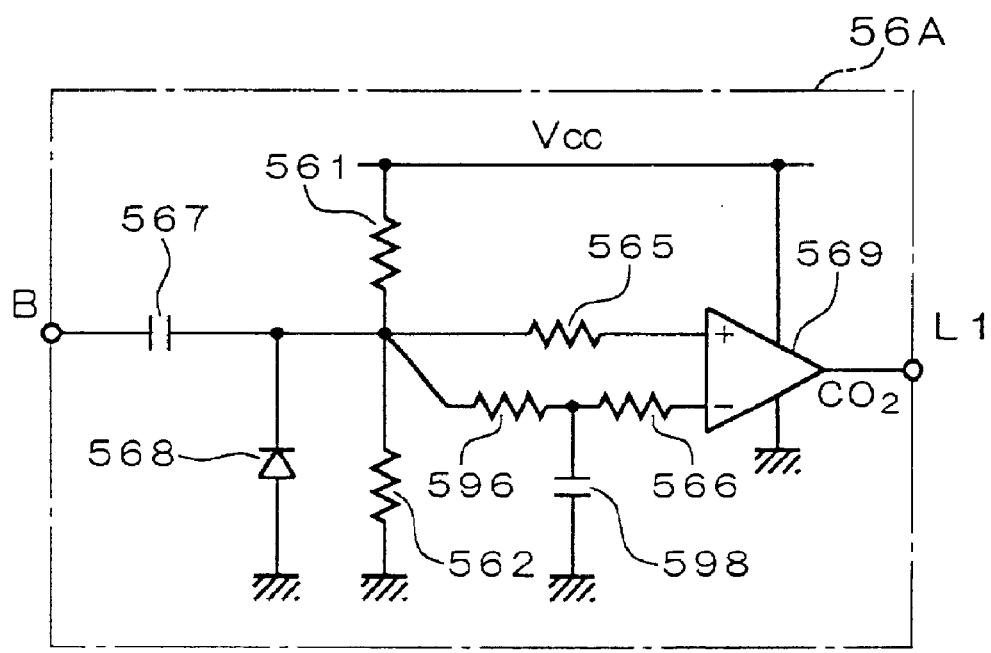
FIG. 10 is a view showing a variation of the ripple detecting unit.

FIG. 10 shows a variation of the ripple detecting unit. The ripple detecting unit 56A shown in FIG. 10 is different from the ripple detecting unit 56 in that the voltage dividing circuit that is comprised of the resistors 563, 564 is substituted by a smoothing circuit that is comprised of a resistor 596 and a capacitor 598. The ripple components included in the output signal of the rectifier 3 are averaged, and the ripple is AC-coupled to provide a reference voltage that follows a DC component fluctuating at a low frequency. The voltage comparator 569 provides ripple pulses that become high in level when the output signal of the rectifier 3 that includes the ripple components becomes higher than the reference voltage.

Figure 11A:
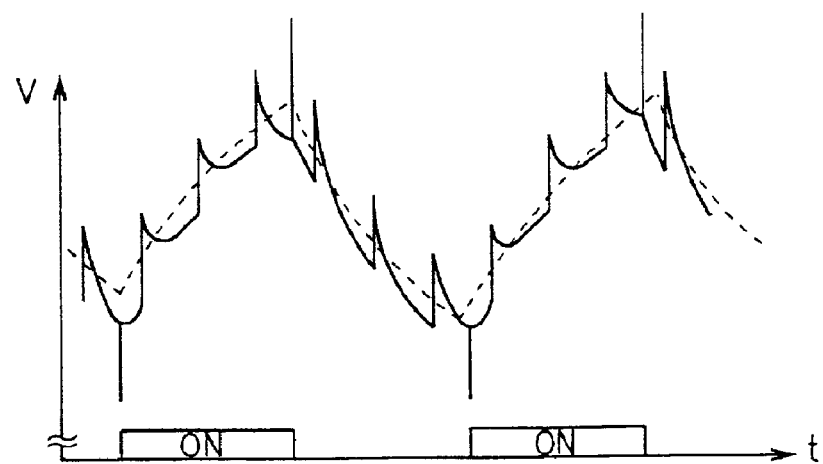
FIGS. 11A–11c are views showing samples of signals of the rectifier.
Figure 11B:
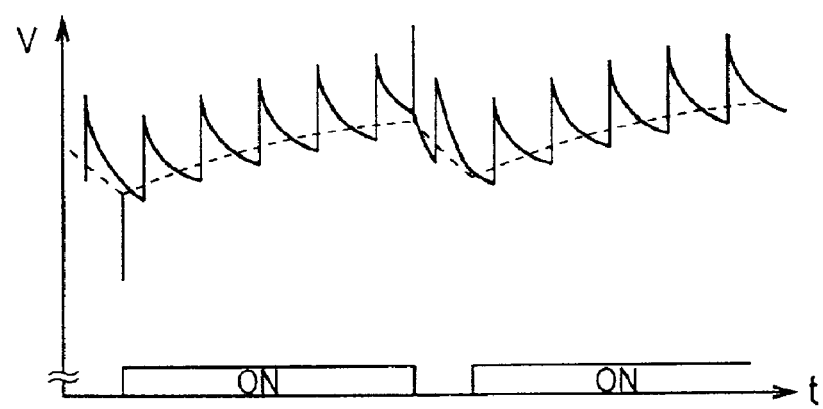
Figure 11C:
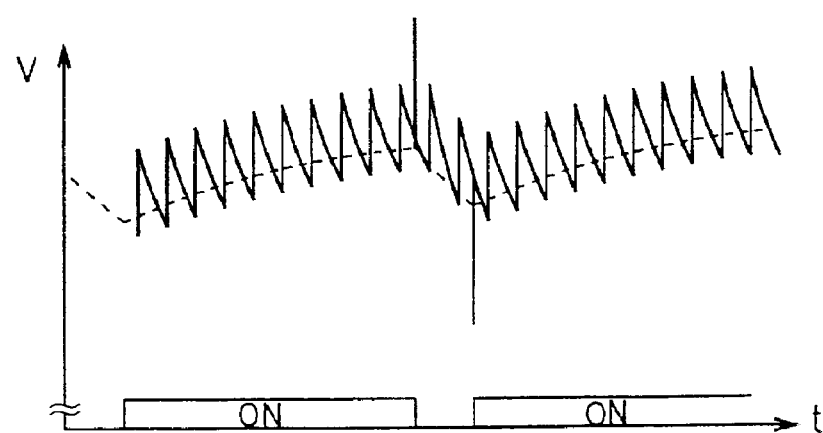

FIG. 11A, FIG. 11B and FIG. 11C respectively show the output signals when the conduction rate of the power transistor 51 is different. In FIG. 11A, FIG. 11B and FIG. 11C, the horizontal axis corresponds to time and the vertical axis corresponds to voltage of the output signal. The periods indicated by "ON" correspond to the closing period of the power transistor 51.

FIG. 11A shows the wave shape of the output signal of the rectifier 3 when the conduction rate of the power transistor 51 is 50%, and FIG. 11B shows the wave shape of the output signal of the rectifier 3 when the conduction rate of the power transistor 51 is 83%. As shown in these figures, the wave shape has roller components that are different from the ripples. The roller components are formed in synchronism with the timing of the opening/closing operation of the power transistor 51. However, the ripple can be accurately detected by the ripple detecting unit 56A.

A vehicle AC generator 1A according to the second embodiment is described hereafter with reference to FIG. 12 and FIGS. 13A–13J. The vehicle AC generator 1A according to the second embodiment includes an additional set of the armature winding 2 and the rectifier 3. However, two or more sets of the armature winding and the rectifier can be added.

Figure 12:
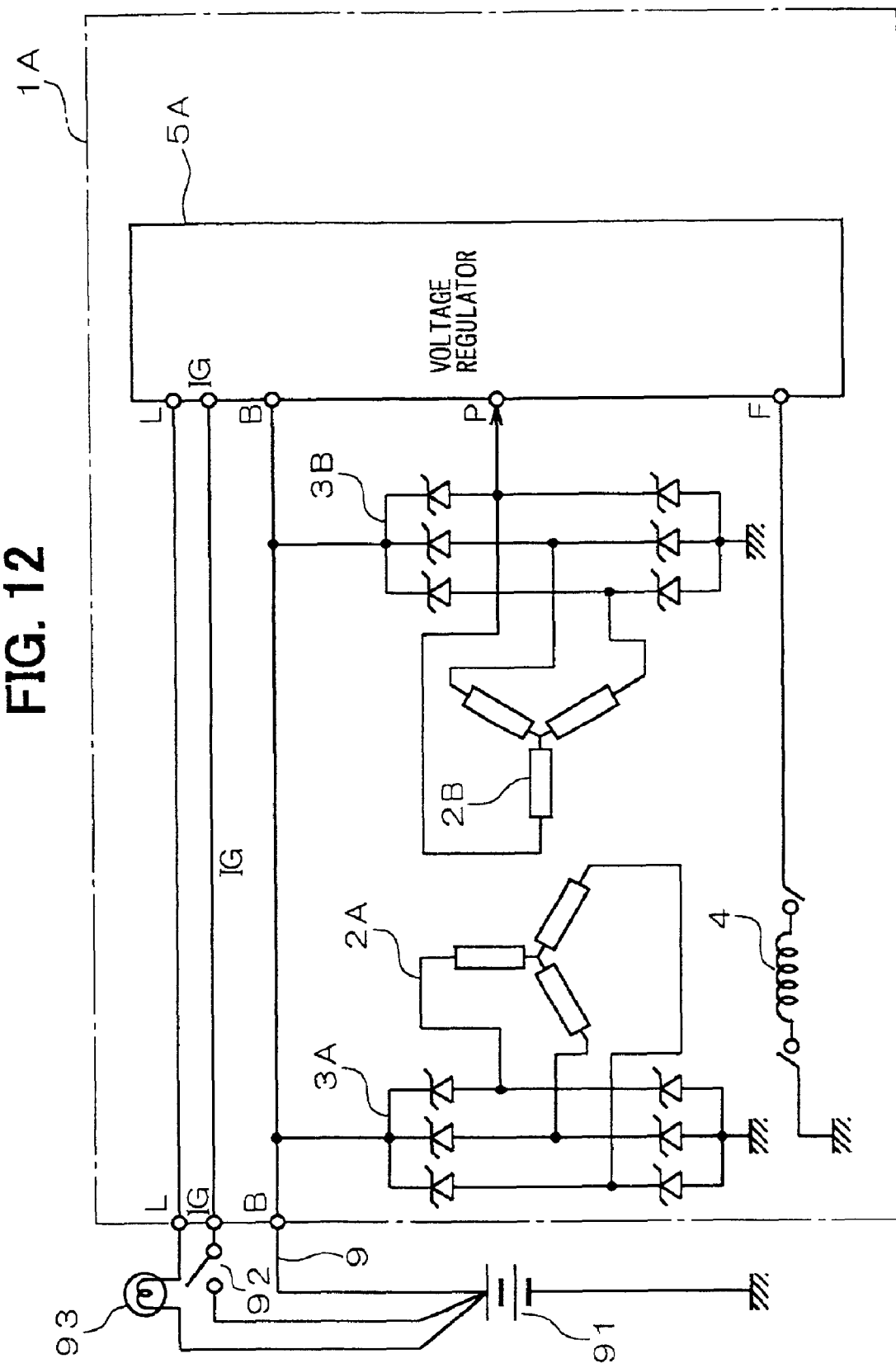
FIG. 12 is a view showing a vehicle AC generator according to the second embodiment of the invention.
Figure 14:
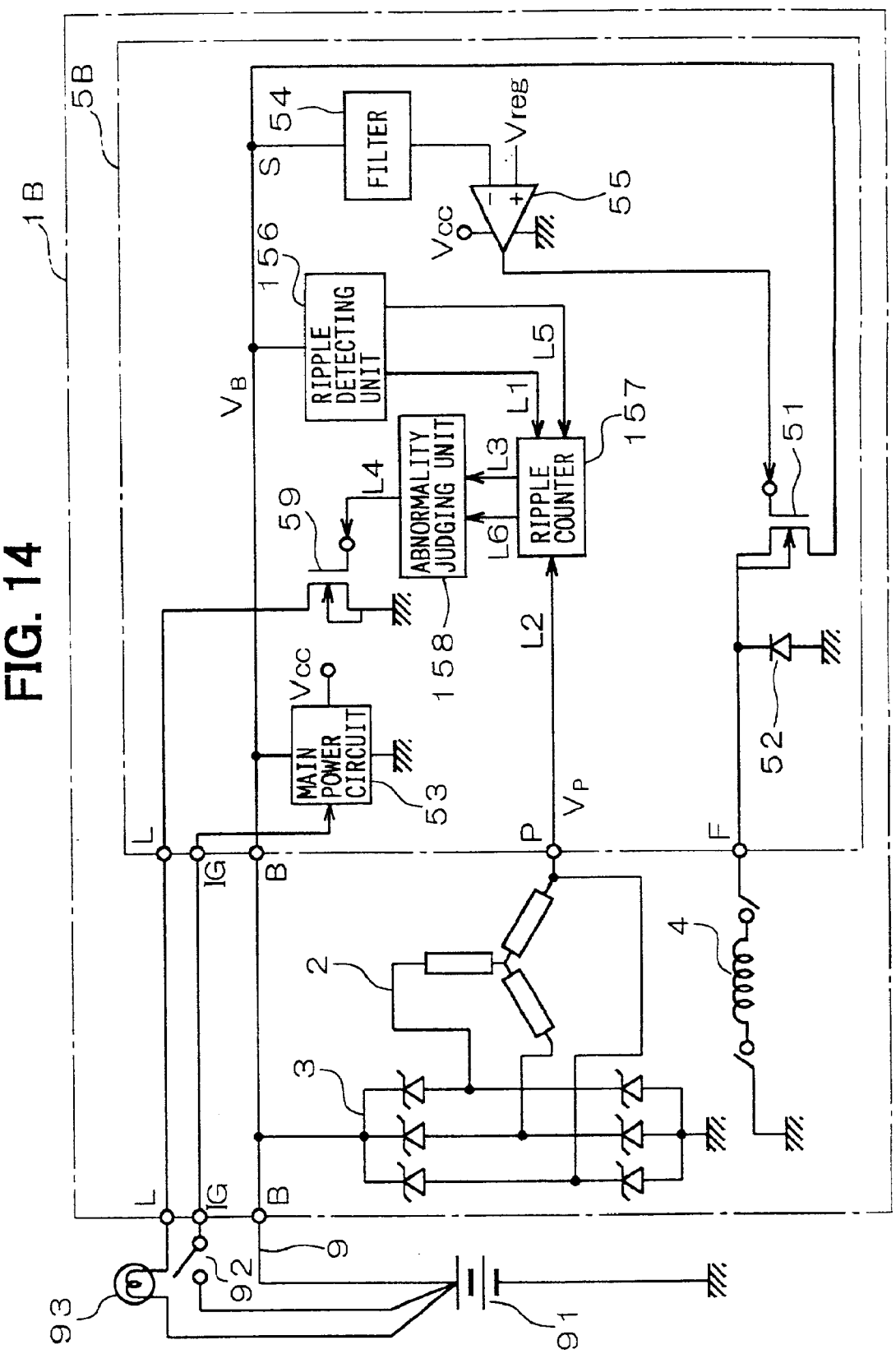
FIG. 14 is a view showing a vehicle AC generator according to the third embodiment of the invention.

As shown in FIG. 12, the vehicle AC generator 1A is comprised of armature windings 2A, 2B, rectifiers 3A, 3B, a field coil 4 and a voltage regulator 5A. The armature winding 2A and the rectifier 3A are coupled, and the armature winding 2B and the rectifier 3B are coupled. The two armature windings 2A, 2B are insulated from each other and are 30° in electric angle spaced apart from each other. The output terminals of the two rectifiers 3A, 3B are jointly connected to B terminal and the voltage regulator 5A. The voltage regulator 5A is the same in structure as the voltage regulator 5 (as shown in FIGS. 1–4).

FIGS. 13A–13J are timing charts showing operation of various portions of the voltage regulator when abnormality does not take place in the vehicle AC generator 1A. As shown in FIG. 13B, each DC output voltage of the armature windings 2A, 2B includes 12 ripple components in each cycle. As shown in FIGS. 13A–13J, the number of the ripples included in the output signal of the voltage regulator 5A is twice as many as the number of the ripples included in the output signal of the voltage regulator 5. The voltage regulator 5A detects abnormality in the same manner as the voltage regulator 5 and turns on the alarm lamp 93.

A vehicle AC generator 1B according to the third embodiment of the invention is described with reference to FIGS. 14–17. The vehicle AC generator 1B according to the third embodiment is comprised of an armature winding 2, a rectifier 3, a field winding 4 and a voltage regulator 5B. The voltage regulator 5B is different from the voltage regulator 5 shown in FIG. 1 in that a ripple detecting unit 56 is substituted by a ripple detecting unit 156 shown in FIG. 15, that the ripple counter 57 is substituted by a ripple counter 157 shown in FIG. 16 and that the abnormality judging unit 58 is substituted by an abnormality judging unit 158 shown in FIG. 17.

Figure 15:
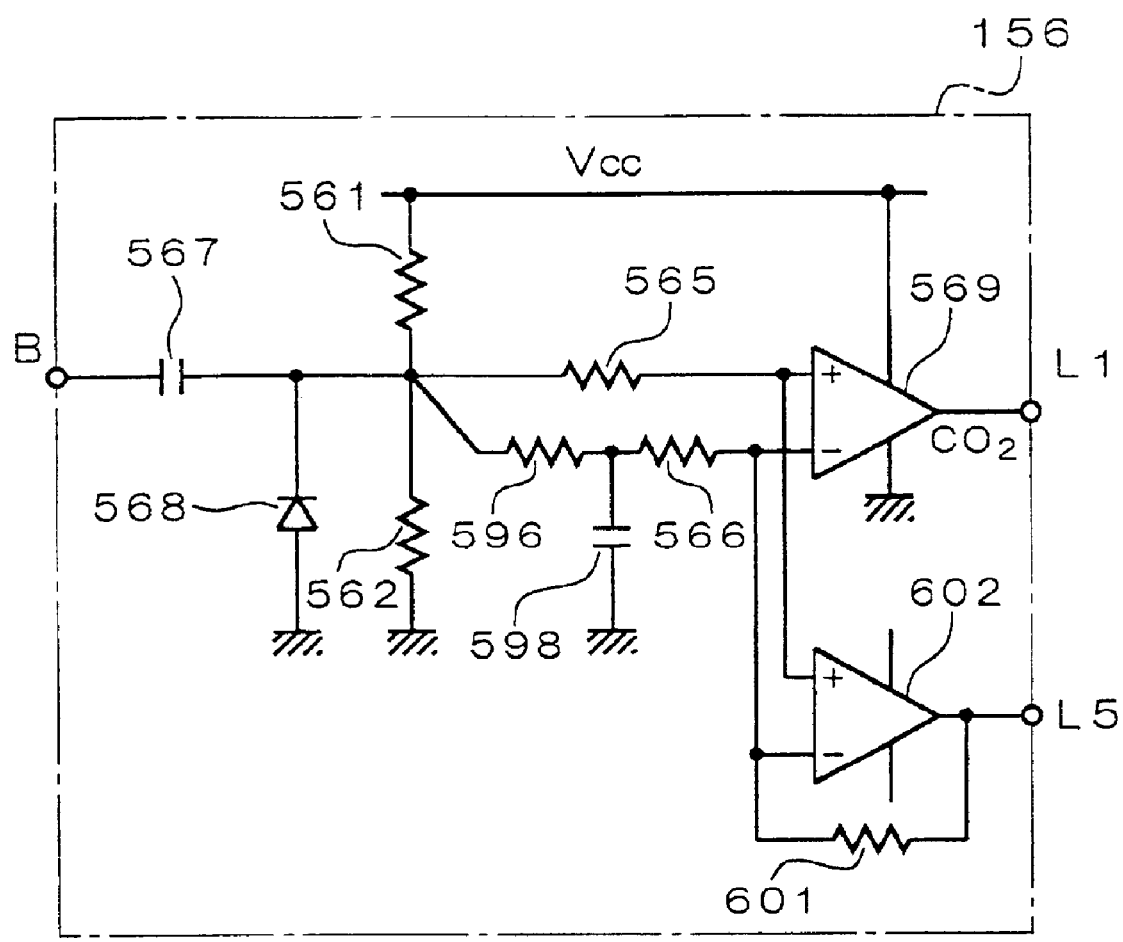
FIG. 15 is a view showing a ripple detecting unit.

The ripple detecting unit shown in FIG. 15 has a Schmitt circuit with a reference voltage having a hysteresis characteristic in addition to the function of the ripple detecting circuit 56A shown in FIG. 10. The Schmitt circuit is comprised of a voltage comparator 602 whose output terminal and minus terminal a reconnected via a resistor 601. Therefore, portions of the input signal beyond the hysteresis level are formed into pulses. Thus, the Schmitt circuit is an amplitude detecting means. The pulse signals outputted from the Schmitt circuit are sent to the ripple counter 157 via a signal line L5.

Figure 16:
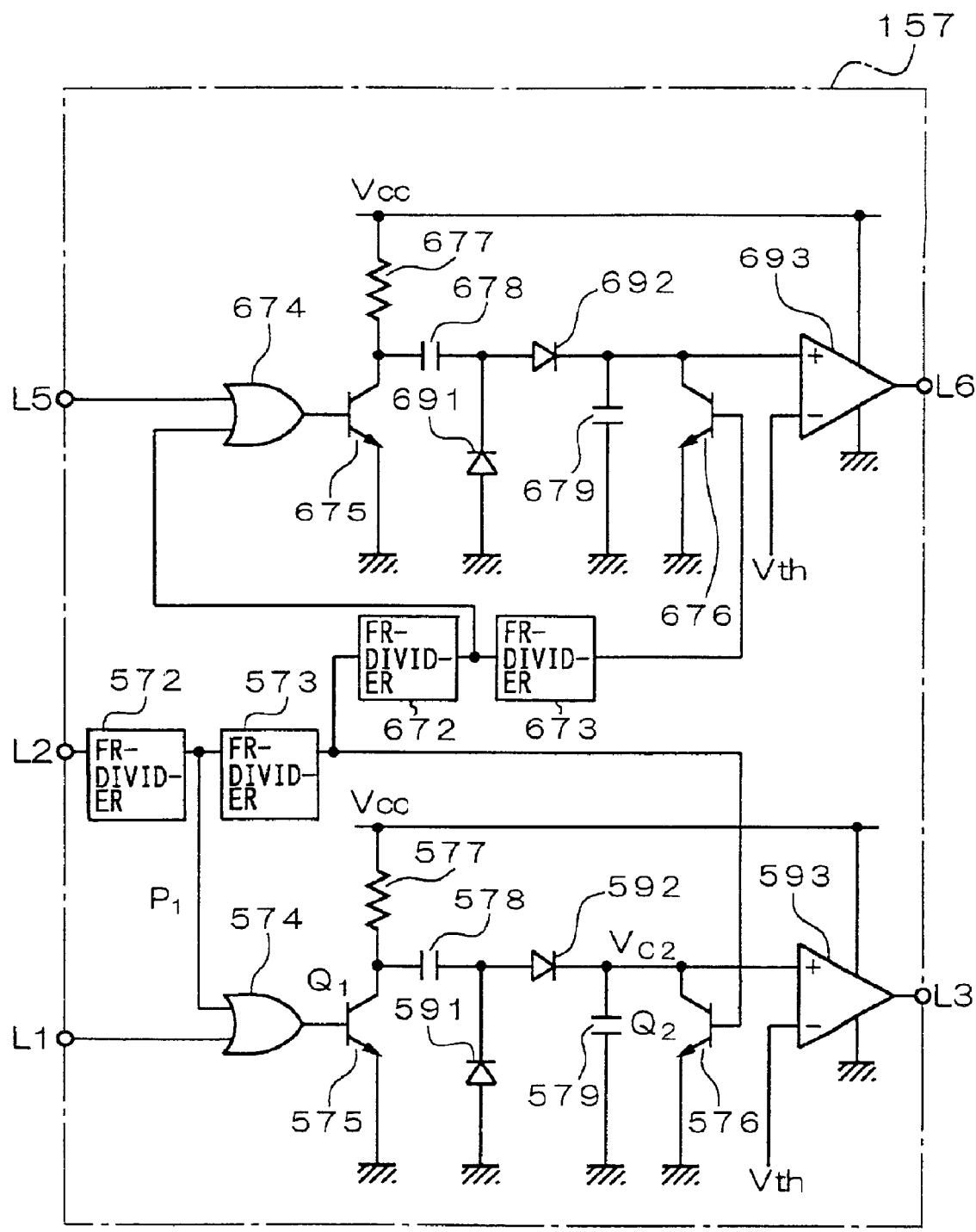
FIG. 16 is a view showing a ripple counter.

The ripple counter shown in FIG. 16 has basically the same structure in addition to the structure of the ripple counter 57. By the added structure, the number of the pulses sent from the Schmitt circuit of the ripple counter 157. The counting operation of the added structure is the same as the ripple counter 57 shown in FIG. 3 except for the counting period and the specification of the elements thereof.

When the ripple detecting unit 156 detects cycle changing components of wide amplitude and outputs a pulse signal, the ripple counter 157 counts the number of pulses. If the number of pulses in a predetermined period is larger than a predetermined number, a high level signal is outputted from the voltage comparator 693, in the same manner as shown in FIG. 5B. This signal is sent to the abnormality judging unit 158 via a signal line L6.

Figure 17:
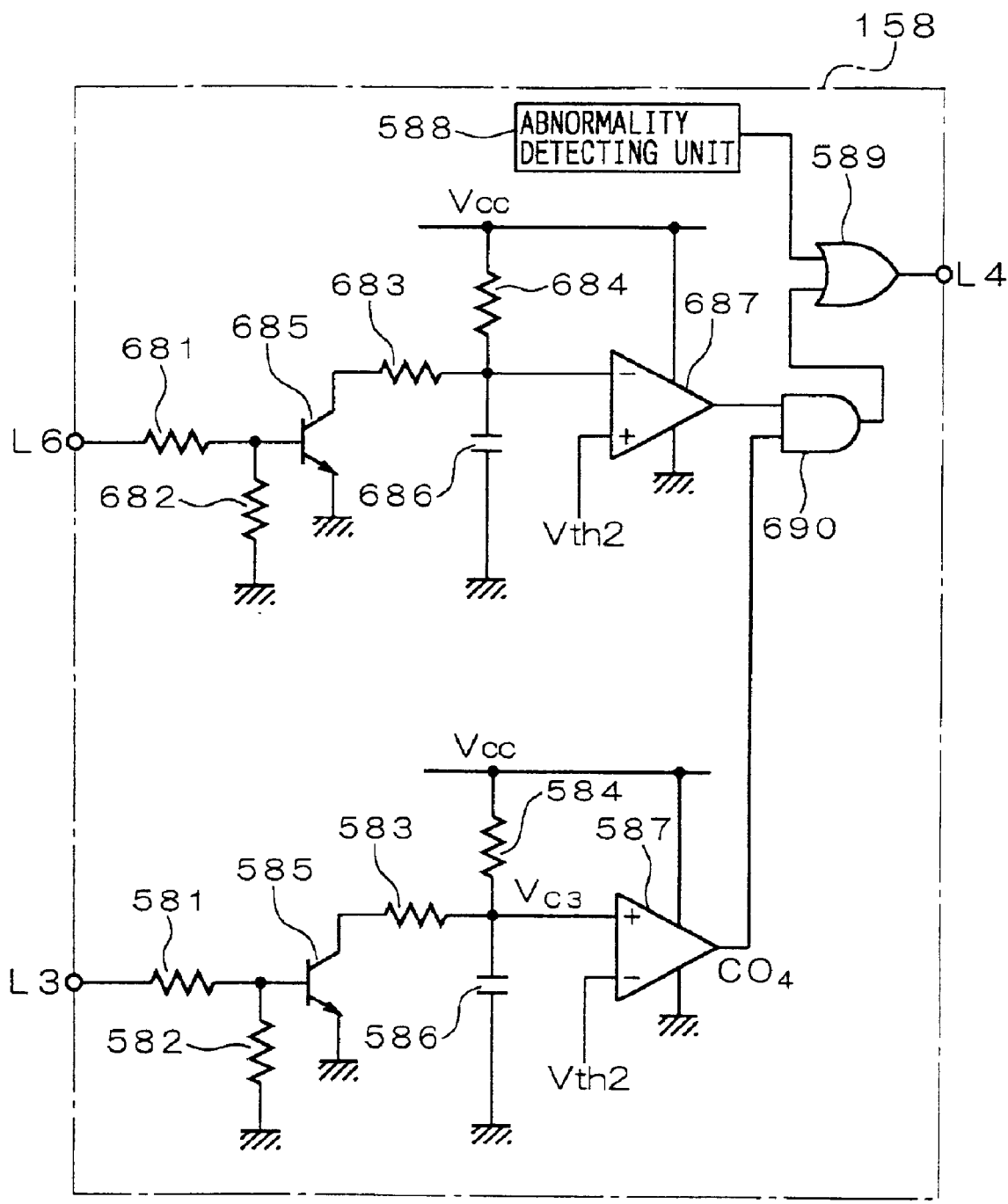
FIG. 17 is a view showing an abnormality judging unit.

As shown in FIG. 17, the abnormality judging unit 158 has a pair of basically the same circuits as the abnormality judging unit 58 shown in FIG. 4. The added circuit judges abnormality based on the signal sent via the signal line L6. However, the voltage regulator 687 included in the added circuit is applied the threshold voltage Vth at the positive terminal thereof to compare the terminal voltage of the capacitor 686 that is applied to the negative terminal thereof.

If cycle changing components of wide amplitude are included in the output voltage of the rectifier 3, a transistor 685 of the added abnormality judging unit 158 cyclically closes to discharge the capacitor 686. Therefore, the terminal voltage of the capacitor 686 does not rise very much, and the output signal of the voltage comparator 687 remains high. If abnormality takes place and the number of the ripples included in the output voltage of the rectifier 3, the output signal of the voltage comparator 687 turns and becomes high. Consequently, a high level signal is outputted from an AND circuit 690. This signal is sent to the alarm lamp driving transistor 59 via the OR circuit 589 to turn on the alarm lamp 93. If the number of the ripples included in the output voltage of the voltage regulator 3 is equal to or more than a predetermined number, the output signal of the voltage comparator 587 remains low. Therefore, the alarm lamp does not light.

If cycle changing components of wide amplitude are not included in the output voltage of the rectifier 3, the transistor 685 of the abnormality judging unit 158 remains open, so that the capacitor 686 is fully charged. Therefore, the output signal of the voltage comparator 687 remains low, and the alarm lamp does not light. Even if a high level signal is erroneously outputted from the voltage comparator 587, the frequency of erroneous operations of the alarm lamp 93 can be reduced if the output voltage of the voltage regulator 3 includes noises having frequency similar to the frequency of the ripple and wider amplitude than the ripples.

For example, the width of the hysteresis of the Schmitt circuit of the ripple detecting unit 156 is designed to be larger than the amplitude of the noise caused by an ignition system that appears on the B terminal of the vehicle AC generator 1B. If abnormality takes place in the power output system of the vehicle AC generator 1B, larger ripple components than the width of the hysteresis are generate. Therefore, the ripples are detected for the alarm.

The invention can be modified into various forms within the gist of the invention. For example, it is possible to employ digital circuits. The rectifier can employ ordinary diodes.

In the above described embodiments, it is possible that the mean value of the DC output voltage of the rectifier 3 or the like is detected to omit alarming if the mean value is higher than a predetermined value. If abnormality takes place, the battery is not fully charged, and, therefore, the battery terminal voltage gradually lowers. It is possible to prevent erroneous alarming by omitting the alarm operation before this stage. For example, a mean voltage detecting circuit can be provided to average the output voltage of the rectifier 3 to provide a high level signal when the mean value of the output voltage is lower than predetermined voltage. In addition, an AND circuit can be provided to drive the alarm lamp driving transistor 59 only when the output signal of the mean voltage detecting circuit is high.

It is also possible to substitute an acoustic device, such as a buzzer or something that vibrates under the driver seat, for the alarm lamp.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. An abnormality detection apparatus of a vehicle AC generator including a multiple phase armature winding and a rectifier having a plurality of rectifying elements that is connected to the armature winding to provide ripple-including outout voltage, said abnormality detection apparatus comnrising:

abnormality judging means for judging abnormality of said vehicle AC generator, said abnormality judging means including ripple detecting means for detecting the number of ripples for a predetermined period to judge an abnormality if the number of ripples that is detected is less than a predetermined number and alarming means, connected to said abnormality judging means, for displaying an alarm when said abnormality detecting means judges said abnormality, wherein said abnormality judging means judges abnormality if the number of ripples that is detected is less than a number defined by an expression km−j for said predetermined period; where m is the number of phases of said multiple phase armature winding, j is the number of said rectifying elements and k is an integer that is 1 or larger than 1.

2. The abnormality detection apparatus of a vehicle AC generator according to claim 1, wherein said abnormality judging means judges abnormality at every period that is in synchronism with at least one-phase output voltage of said multiple phase armature winding.

3. The abnormality detection apparatus of a vehicle AC generator according to claim 1, wherein at least one of said rectifying elements is a diode having a backward breakdown characteristic.

4. The abnormality detection apparatus of a vehicle AC generator according to claim 1, wherein
said vehicle AC generator comprises a plurality of multiple phase windings insulated from each other and a plurality of rectifiers for respectively rectifying output voltages of said plurality of multiple phase windings.

5. The abnormality detection apparatus of a vehicle AC generator according to claim 1, wherein
said abnormality judging means comprises a smoothing circuit for smoothing ripple components of said output voltage of said rectifier to provide a reference value, said abnormality judging means judging abnormality by comparing said reference value with said output voltage of said rectifier.

6. The abnormality detection apparatus of a vehicle AC generator according to claim 1, further comprising an amplitude detecting means for detecting amplitude of said output voltage of said rectifier, wherein
said alarming means stops displaying an alarm if said amplitude of said output voltage detected by said amplitude detecting means is equal to or smaller than a predetermined value.

7. The abnormality detection apparatus of a vehicle AC generator according to claim 1, further comprising voltage mean value detecting means for detecting a voltage mean value of said output voltage of said rectifier, wherein
said alarming means stops displaying an alarm if said voltage mean value detected by said voltage mean value detecting means is equal to or larger than a predetermined value.

8. An abnormality detection apparatus of a vehicle AC generator including a multiple phase armature winding and a rectifier having a plurality of rectifying elements that is connected to the armature winding to provide ripple-including output voltage, said abnormality detection apparatus comprising:
abnormality judging means for judging abnormality of said vehicle AC generator, said abnormality judging means including ripple detecting means for detecting the number of ripples for a predetermined period to judge an abnormality if the number of ripples that is detected is less than a predetermined number and
alarming means, connected to said abnormality judging means, for displaying an alarm when said abnormality detecting means judges said abnormality, and
conduction rate detecting means for detecting conduction rate of switching means for interrupting current supplied to a field coil of said vehicle AC generator, wherein
said alarming means stops displaying an alarm if said conduction rate is smaller than a value expressed by (2 km−j)/2 km; where m is the number of phases of said multiple phase armature winding, j is the number of said rectifying elements and k is an integer that is 1 or larger than 1.

9. An abnormality detection apparatus of a vehicle AC generator including an armature winding having a plurality of phase windings, a voltage regulator and a rectifier connected to said armature winding to provide ripple-including output voltage, said abnormality detection apparatus comprising:
ripple detecting means for detecting the number of ripples included in output voltage of said rectifier for a predetermined period;
abnormality judging means for judging abnormality if said number of ripples is less than a predetermined number; and
alarming means, connected to said abnormality judging means, for displaying an alarm when said abnormality detecting means judges abnormality;
said abnormality judging means judges abnormality at a timing in synchronism with output voltage of said armature winding and comprises a voltage comparator and a circuit for providing a means value of said output voltage of said rectifier, and wherein said voltage comparator compares mean value with said output voltage; and
said rectifier is comprised of a plurality of Zener diodes.

10. The abnormality detection apparatus of a vehicle AC generator according to claim 9, further comprising an amplitude detecting means for detecting amplitude of said output voltage of said rectifiers, wherein
said alarming means stops displaying an alarm if said amplitude of said output voltage detected by said amplitude detecting means is equal to or smaller than a predetermined value.

11. The abnormality detection apparatus of a vehicle AC generator according to claim 9, further comprising an amplitude detecting means for detecting amplitude of the output voltage of said rectifier wherein said alarming means stops displaying an alarm if said amplitude of the output voltage detected by said amplitude detecting means is equal to or smaller than a predetermined value.

12. An abnormality detection apparatus of a vehicle AC generator including a multiple phase armature winding and a rectifier having a plurality of rectifying elements that is connected to the armature winding to provide ripple-including output voltage, said abnormality detection apparatus comprising:
abnormality judging means for judging abnormality of said vehicle AC generator, said abnormality judging means including ripple detecting means for detecting the number of ripples for a predetermined period to judge an abnormality if the number of ripples that is detected is less than a predetermined number and
alarming means, connected to said abnormality judging means, for displaying an alarm when said abnormality detecting means judges said abnormality; and
wherein said abnormality judging means judges abnormality if the number of the ripples is less than a number defined by an expression km−j for said predetermined period; where m is the number of phases of said multiple phase armature winding, j is the number of said rectifier, and k is an integer that is 1 or larger than 1.

13. An abnormality detection apparatus of a vehicle AC generator including a multiple phase armature winding and a rectifier having a plurality of rectifying elements that is connected to the armature winding to provide ripple-including output voltage, said abnormality detection apparatus comprising:
abnormality judging means for judging abnormality of said vehicle AC generator, said abnormality judging means including ripple detecting means for detecting the number of ripples for a predetermined period to judge an abnormality if the number of ripples that is detected is less than a predetermined number and
alarming means, connected to said abnormality judging means, for displaying an alarm when said abnormality detecting means judges said abnormality; and conduction rate detecting means for detecting conduction rate of switching means for interrupting current supplied to a field coil of said vehicle AC generator, wherein said alarming means stops displaying an alarm if the conduction rate is smaller than a value expressed by (2 km−j)/2 km; where m is the number of phases of said multiple phase armature winding, j is the number of said rectifier and k is an integer that is 1 or larger than 1.

14. An abnormality detection apparatus of a vehicle AC generator including a multiple phase armature winding and a rectifier having a plurality of rectifying elements that is connected to the armature winding to provide ripple-including outout voltage, said abnormality detection apparatus comprising:

abnormality judging means for judging abnormality of said vehicle AC generator, said abnormality judging means including ripple detecting means for detecting the number of ripples for a predetermined period to judge an abnormality if the number of ripples that is detected is less than a predetermined number and alarming means, connected to said abnormality judging means, for displaying an alarm when said abnormality detecting means judges said abnormality; and wherein said abnormality judging means judges abnormality based on the ripples detected by comparing a value of the output voltage from the rectifier with a mean value of the output voltage from the rectifier.

15. An abnormality detection apparatus of a vehicle AC generator including a multiple phase armature winding and a rectifier having a plurality of rectifying elements that is connected to the armature winding to provide ripple-including output voltage, said abnormality detection apparatus comprising:

abnormality judging means for judging abnormality of said vehicle AC generator, said abnormality judging means including ripple detecting means for detecting the number of ripples for a predetermined period to judge an abnormality if the number of ripples that is detected is less than a predetermined number and alarming means, connected to said abnormality judging means, for displaying an alarm when said abnormality detecting means judges said abnormality; and further comprising an amplitude detecting means for detecting amplitude of said output voltage from said rectifier, wherein said alarming means stops displaying an alarm if the amplitude of the output voltage detected by said amplitude detecting means is equal to or smaller than a predetermined value.

16. An abnormality detection apparatus of a vehicle AC generator including an armature winding having a plurality of phase windings, a voltage regulator and a rectifier connected to said armature winding to provide ripple-including output voltage, said abnormality detection apparatus comprising:

ripple detecting means for detecting the number of ripples included in output voltage of said rectifier for a predetermined period;

abnormality judging means for judging abnormality if said number of ripples is less than a predetermined number; and alarming means, connected to said abnormality judging means, for displaying an alarm when said abnormality detecting means judges abnormality;

said abnormality judging means judges abnormality at a timing in synchronism with output voltage of said armature winding and comprises a voltage comparator and a filter, and wherein said voltage comparator compares a mean value of the output voltage from the rectifier with the output voltage from the rectifier; and said rectifier is comprised of a plurality of Zener diodes.

* * * * *